No. 703,511. Patented July 1, 1902.
G. WOOD.
OIL VAPOR ENGINE.
(Application filed Feb. 16, 1901.)

(No Model.) 6 Sheets—Sheet 1.

WITNESSES.
F.E. Arthur
H.C. Chase

INVENTOR.
George Wood
BY
Smith & Davidson
ATTORNEYS.

No. 703,511. Patented July 1, 1902.
G. WOOD.
OIL VAPOR ENGINE.
Application filed Feb. 16, 1901.
(No Model.) 6 Sheets—Sheet 2.

Fig. 2

WITNESSES.
INVENTOR
George Wood
BY
Smith & Benson
ATTORNEYS.

No. 703,511. Patented July 1, 1902.
G. WOOD.
OIL VAPOR ENGINE.
(Application filed Feb. 16, 1901.)
(No Model.) 6 Sheets—Sheet 3.

Fig. 3.

WITNESSES.
H. E. Chase,
F. E. Arthur.

INVENTOR.
George Wood
BY
Smith & Druison
ATTORNEYS.

No. 703,511. Patented July 1, 1902.
G. WOOD.
OIL VAPOR ENGINE.
(Application filed Feb. 16, 1901.)
(No Model.) 6 Sheets—Sheet 4.

WITNESSES:

INVENTOR
George Wood
Smith & Dinison
ATTORNEYS.

No. 703,511. Patented July 1, 1902.
G. WOOD.
OIL VAPOR ENGINE.
(Application filed Feb. 16, 1901.)
(No Model.) 6 Sheets—Sheet 6.

WITNESSES:
F. E. Arthur
H. E. Chase

INVENTOR
George Wood
BY
Smith & Druidsm
ATTORNEYS.

UNITED STATES PATENT OFFICE.

GEORGE WOOD, OF NEWARK, NEW JERSEY.

OIL-VAPOR ENGINE.

SPECIFICATION forming part of Letters Patent No. 703,511, dated July 1, 1902.

Application filed February 16, 1901. Serial No. 47,699. (No model.)

*To all whom it may concern:*

Be it known that I, GEORGE WOOD, of Newark, in the county of Essex, in the State of New Jersey, have invented new and useful Improvements in Oil-Vapor Engines, of which the following, taken in connection with the accompanying drawings, is a full, clear, and exact description.

This invention relates to improvements in oil-vapor engines, and is particularly adapted for the use of kerosene-oil as a fuel for combustion within the explosion-chambers.

The object of my invention is to produce a simple, compact, and highly efficient compound engine for automobile or marine purposes in which kerosene-oil is vaporized by a burner supplied from the same source as that which supplies the oil for vaporizing.

The further object of my invention is to so construct and arrange the various parts of my invention as to produce a high rate of speed with as little vibration to the engine as possible.

A still further object of this invention is to provide an electric igniting mechanism having fixed spark-terminals within the explosion-chambers and a circuit-closer controlled by one of the moving parts of the engine and also to provide battery and dynamo circuits connected to the igniting mechanism and to a suitable switch, whereby the circuit is first closed through the battery for starting the engine and may then be switched to the dynamo-circuit operated by one of the moving parts of said engine.

To this end the invention consists in the combination, construction, and arrangement of the component parts of an oil-vapor engine, as hereinafter fully described, and pointed out in the claims.

Referring to the drawings.

Similar reference characters indicate corresponding parts in all the views.

This invention consists, essentially, of a supporting-frame A, a plurality of cylinders B, pistons C, movable in said cylinders, a walking-beam D, composed of sections and connected to the pistons C, a rotary crank-shaft E, mounted on the frame and connected to the walking-beam sections, a vaporizer F, connected to the explosion-chambers, means for supplying oil to the vaporizer, electric means for igniting the gases within the explosion-chamber, and means for creating a circulation of water in the water-jackets of the cylinders.

The supporting-frame A may be of any desired form or construction, and preferably consists of a bed or base plate 1, a shell or casing 2, and suitable upright standards 3. The bed or base plate 1 may be mounted upon suitable standards when used as a stationary engine, the shell or casing 2 being adapted to receive the walking-beam D and is provided with removable side-wall sections 4, having caps 5 for receiving the opposite ends of a tubular bearing 6, which forms the pivotal support for the walking-beam sections, presently described. The upper wall of the shell or casing 2 is provided with openings 7 for receiving the lower ends of the cylinders B, also presently described. This upper wall of the shell or casing 2 is also provided with suitable apertures 8, arranged at the opposite sides of the openings 7 for receiving the connecting-rods which connect the walking-beam to the crank-shaft, hereinafter described.

The shell or casing 2 is arranged to receive and retain a quantity of oil for lubricating the bearings of the walking-beam and connecting-rods arranged therein, the removable sections 4 and caps 5 serving to permit access to the interior of said shell or casing when desired to remove or repair any of the parts arranged therein. The upright standards 3 serve to support the crank-shaft E, and preferably consist of braces or brackets having their lower ends secured to the side walls of the shell or casing 2 by suitable fastening means, as bolts 9, and their upper ends provided with laterally-extending hubs or bushings 10, formed of greater diameter than the adjacent diameter of the shaft E for receiving said shaft and permitting the insertion of suitable roller-bearings 11 for reducing the friction of said shaft in said bushings. In order that the sleeves 10 may be readily inserted into or removed from the upper ends of the brackets or standards 3, I usually provide said standards with removable caps, which are clamped around the inner ends of said sleeve or bushing by suitable clamping-bolts 12. This forms a particularly simple and economical bearing for the shaft and may be readily removed and a new one inserted when said bearings become worn or otherwise rendered unfit for use.

In order that my improved engine may be readily adapted for stationary, marine, or automobile uses, I generally provide the casing 2 with laterally-projecting flanges 13, which are adapted to rest upon and to be secured to any suitable supporting-wall, as the frame of a boat or automobile or suitable table or bed of a stationary support.

The cylinders B may be of any desired size, are provided with an explosion-chamber 14 and a water-jacket 15, one end of said chamber being closed by a suitable wall 16 and the other end being opened for permitting the insertion and movement of the piston C, presently described.

The lower end of each cylinder B is generally reduced in diameter for forming an annular shoulder 17, adapted to rest upon the upper wall of the shell or casing 2, the lower reduced portion of said cylinder being extended into the interior of said shell or casing in order to economize in the height of said cylinders and also to supply lubricant to the moving piston from the oil-chamber in the base of the shell or casing. The upper end wall of the explosion chamber or cylinder is preferably removable therefrom, is secured in position by bolts 18, and is provided with inlet and exhaust chambers 19 and 20, communicating with the explosion-chamber through suitable inlet and exhaust ports 21 and 22. These inlet and exhaust ports are provided with valves 23 and 24, opening inwardly into the explosion-chamber and provided with valve-stems 25 and 26, movable in guides formed, respectively, in the upper walls of the chambers 19 and 20. These valves are normally held in their closed position by springs 27 and 28, interposed between suitable shoulders provided, respectively, on the outer ends of the stems 25 and 26 and the adjacent outer walls of the chambers 19 and 20. These valves 23 and 24 are generally arranged in pairs, each cylinder being provided with an inlet-valve 23 for admitting the vapor or live gases to the explosion-chamber at a predetermined interval of movement of the piston of said chamber and with an exhaust-valve 24 for permitting the discharge of the vitiated or exploded gases from said cylinder, also at a predetermined interval of movement of said piston.

The inlet-valve of each chamber is adapted to be opened automatically by the suction of each alternate downward stroke of the piston for drawing the vapor into the explosion-chamber above the cylinder. Upon the following upward stroke of said piston the inlet-valve is automatically closed, the gases or vapor admitted to the chamber are compressed within the explosion-chamber, and when the piston reaches the limit of its upward stroke or is just on the point of its return down-stroke the electric circuit for the sparking device is closed, thereby igniting the compressed gases and forcing the piston to the limit of its downward movement. When the piston reaches or approaches this limit of its downward movement, the exhaust-valve 24 is automatically opened by a suitable mechanism, hereinafter described, so that when the piston returns upwardly by the momentum of the previous discharge or explosion the vitiated or exhaust gases are forced outwardly through the exhaust-port 22 and chamber 20 through a muffler 20' or to the atmosphere, as may be desired.

It is evident from the foregoing description that the cylinders B extend above the upper walls of the shell or casing 2, and that the inlet-chambers 19 and 20 and inlet and outlet openings 21 and 22 are formed in the upper end walls of said cylinders, and that the valve 23 is opened at each alternate downward stroke of the piston for admitting the live gases to the explosion-chamber, and that the intervening alternate downward strokes of the piston are caused by the explosion of said gases in the explosion-chamber. It is further evident that the valve 24 is opened at each alternate upward stroke of the piston immediately after the downward movement of said piston after each explosion for discharging the exploded gases from the explosion-chamber.

Figure 3:
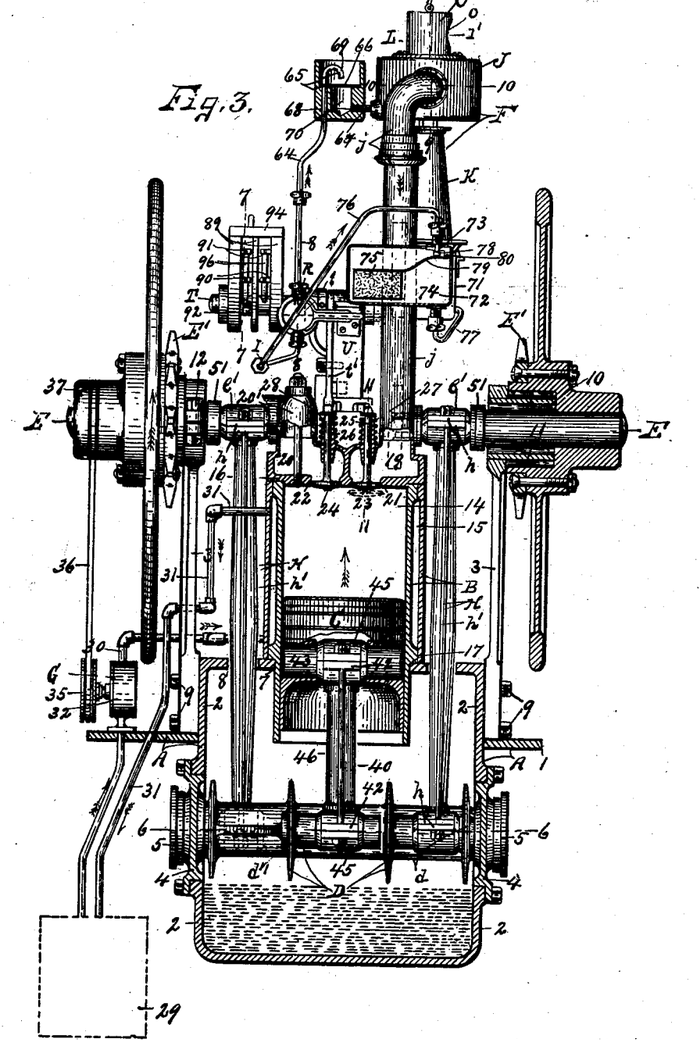
Figs. 3 and 4 are sectional views taken, respectively, on lines 3 3 and 4 4, Fig. 1, the pistons in Fig. 4 being shown, respectively, in their extreme upper and lower positions, the exhaust-valve being shown as open in one of the explosion-chambers, and the circuit-closers being shown in operative position for the other explosion-chamber.

The water-jacket 15 surrounds the intermediate portion of the explosion-chamber and is usually supplied with water by a suitable pump G, which is connected to a source of water-supply 29 and is also connected to the lower portions of the water-jacket by a conduit 30, the upper portion of said water-jacket being provided with an overflow-conduit 31, which usually communicates with or discharges into the source of water-supply 29, Fig. 3. This pump G preferably consists of an outer casing 32, having inner annular recesses 33 and intermeshing gears 34, journaled in said casing and formed of substantially the same diameter as the annular recesses 33. These gears 34 may be rotated in any desired manner, one of said gears having its shaft or spindle extended through the outer walls of the casing 32 and is provided with a pulley 35, connected by a belt 36 to a suitable pulley 37, mounted on the driving-shaft E. This pulley 37 usually consists of the hub of one of the balance-wheels previously mentioned, and the belt 36 is so connected to said pulley of the shaft E and pump-gear shaft as to rotate said gears in the direction indicated by arrow $z$, Fig. 13.

Figure 13:
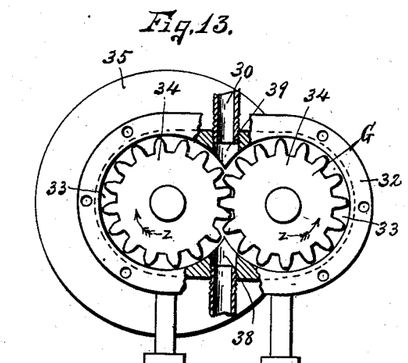
Fig. 13 is an elevation of the detached pump for supplying water to the water-jacket, the outer cap being removed for showing the interior mechanism.
Figure 14:
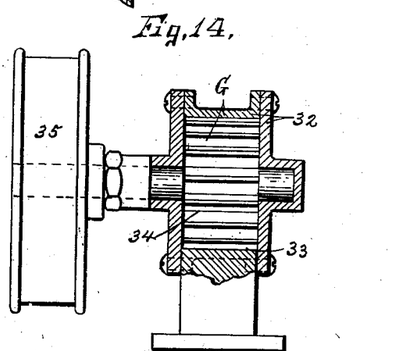

The shell or casing 32 of the pump is provided with inlet and outlet passages 38 and 39, arranged directly opposite each other and in alinement with the contiguous faces of the gears 34, the passage 38 being connected to the source of water-supply (not illustrated) and the passage 39 being connected by the conduit 30 to the base of the water-jacket 15 previously described, the gears 34 being arranged to closely fit within the annular recesses 33 and in proximity to the inlet-passage 38. It will be evident that when the faces of said gears adjacent to the inlet-passage are rotated in opposite directions from said passage the water will be drawn through the passage 38 and forced outwardly through the passage 39 by the teeth of said gears, thus forming a particularly simple and practical means for creating a circulation of water through the water-jackets, it being understood that the overflow-conduits 31 return the water to the source of supply, as previously stated.

The pistons C are movable within the cylinders B and are connected by piston-rods 40 to independently-movable sections $d\ d'$ of the walking-beam D. As seen in the drawings, these piston-rods usually consist of substantially central bars having their opposite ends provided with bearing-faces 41 and apertured flanges 42, the upper bearing-faces being adapted to engage suitable spindles or shafts 43 of the pistons C and the lower bearing-faces being arranged to engage bearing-faces 44 of the walking-beam sections $d\ d'$. These connecting-rods are also provided with removable caps 45 at their opposite ends and with tie-bolts 46, which are passed through the apertures of the flanges 42 and similar apertures formed in the caps for simultaneously forcing said caps into engagement with the shafts 43 and bearings 44.

The piston-rod just described forms a particularly simple means of uniting the shaft of the pistons to the bearings of their respective walking-beam sections and serve to materially strengthen the piston-rods when in operation.

The walking-beam D, as previously stated, is composed of independently-movable sections $d\ d'$, each of which is mounted upon the intermediate portion of a transversely-arranged shaft or tube 6, having its opposite ends supported in apertures 47 in the side walls of the shell or casing 2, said ends of the shaft or tube being inclosed or protected by the caps 5, previously described. Each of the sections $d\ d'$ is journaled at its intermediate portion upon the shaft 6 and is provided with oppositely-extending arms 48 and 49, projecting in opposite directions from said shaft or bearing 6. One of the arms 48 of each section is provided with a bearing 44 for receiving the piston-rod, and the other arm 49 is provided with a bearing 50 for receiving the lower end of a connecting-rod, presently described. The bearings 44 of each of the sections are arranged at opposite sides of the shaft or bearing 6 in substantial alinement with each other and with the centers of the pistons C, and the bearings 50 are also arranged at opposite sides of the shaft 6, but at opposite sides or ends of the bearings 44. In other words, the bearing 50 of one of the sections is arranged at one side or end of the bearing 44, and the bearing 50 of the other section is arranged at the opposite side or end of the adjacent bearing 44, and it is apparent that said bearings 50 are arranged in staggered relation to each other, being usually offset a sufficient distance, so that the connecting-rods connected thereto are movable in close proximity to the opposite outer faces of the cylinder B. The intermediate portions of each of the arms of each of the sections of the walking-beam are usually cut away for the purpose of lightening the sections and for forming separated arms for receiving the ends of the bearings 44 and 50.

It is apparent from the foregoing description that the walking-beam B is pivotally supported in a plane beneath the open ends of the cylinders, that the bearings 44 are arranged in substantial alinement with the centers of their respective pistons, and the sections of said walking-beam are movable independently of each other, for a purpose hereinafter described.

The shaft E is revolubly supported upon the upper ends of the upright standards 3 in a plane above the upper or closed end of the cylinders B within the bushings or bearings 11, said shaft being arranged substantially parallel with the lower shaft 47 and is extended beyond said bushings for receiving suitable balance-wheels $e$, which are mounted on the opposite ends of said shaft at opposite sides of the cylinders B and are provided with sprocket-wheels or other power-transmitting mechanism E′, adapted to be connected to the axle of a vehicle or to any other mechanism which it may be desired to propel or operate.

The shaft E is provided with crank-arms 51, which are arranged in substantially the same vertical plane as the bearings 50 of the corresponding sections of the walking-beam D and are connected to the bearings 50 by suitable connecting-rods H in such manner that when one of the pistons is moved to its extreme upper limit of movement the other piston is moved to its extreme lower position in order that both pistons may be operated alternately with each other by the alternate explosion within the explosion-chambers of the cylinders B. In other words, the crank-arms are arranged to project in diametrically opposite directions from the axis of the shaft, the connecting-rods being formed of the same length and serving to connect said crank-arms with the corresponding bearings of the walking-beam sections. These connecting-rods are constructed similarly to the piston-rods 40, each usually consisting of a central bar having opposite end bearing-faces and removable caps $e'$, said caps and adjacent ends of the connecting-rod being provided with laterally-projecting flanges $h$, having apertures for receiving suitable tie-bolts $h'$, arranged at opposite sides of the central bar, and having their opposite ends extending through said apertures and engaged with the outer faces of the caps for drawing said caps toward each other and also for forcing the bearings in the opposite end faces of the central bar into engagement with the adjacent bearings of the crank-arm and walking-beam section. The tie-bars $h'$ also serve to materially stiffen the connecting-rod and permit the parts of said connecting-rod to be readily assembled or removed when desired.

In the operation of my invention I preferably employ a suitable oil-vapor, as kerosene-oil, which is supplied from a tank or reservoir. (Not illustrated.) It is then vaporized by a mechanism or device hereinafter described and is then discharged or drawn into the explosion-chambers of the cylinders in the manner hereinbefore described. The oil-supply tank may be of any desired form or construction (not necessary to herein illustrate or describe) and is connected to the vaporizing device by a suitable conduit I of sufficient size to feed the oil in the desired quantities. This vaporizing device usually consists of a reservoir J for receiving the oil and an oil-burner K, which is preferably supplied with oil from the same conduit or source as that which supplies the oil to the reservoir J. This reservoir is preferably arranged above the cylinders and is connected to each of said cylinders by vapor-conduits $j$, discharging into the inlet-chambers 19 of their respective cylinders. In order that the proper amount of air may be mixed with the vaporized oil, I usually provide the reservoir J with an air-receiving chamber L, having an opening $l$ in its base connecting with the interior of the reservoir J and also provided with an additional opening $l'$ for admitting air to the interior of the chamber L.

The opening $l$ is normally closed by a valve $m$, which opens into the reservoir J and is held in its normal closed position by a suitable spring $m'$, interposed between a shoulder provided on the upper end of the valve-stem and a transverse bar $n$ on the interior of the chamber L, said transverse bar being provided with an aperture for receiving the said valve-stem. The quantity of air admitted to the interior of the chamber L through the opening $l'$ is regulated by the rocking valve-sleeve O, telescoping with the walls of the chamber L and provided with an opening $o$, movable into and out of registration with the opening $l'$, thereby being adapted to vary the size of the opening, and consequently regulate the amount of the air admitted to the air-chamber L and to the reservoir J.

It will be understood upon reference to the foregoing description that when one of the pistons is moved downwardly toward its open end at the proper time for drawing in a charge of gases the valves 23 and also the valve $m$ are opened by the suction of the piston and the vaporized oil and air mixed therewith is drawn into the explosion-chamber, it being understood that the valves 23 and $m$ are opened by the suction of the piston in its downward movement.

In order to facilitate the mixing of the air with the vaporized gases within the chamber or reservoir J, I provide said reservoir with a rotary shaft $p$, having a series of blades P, which are slightly inclined in the direction of movement and are disposed in a plane beneath the center of the outlet-openings for the vapor for insuring a more perfect mixing of the oil-vapor and air within the reservoir J. The means for supplying the oil to the reservoir usually consists of a piston-pump R, having its piston adapted to be actuated in one direction by a spring S and movable in the opposite direction by cam-shoulders $r$, mounted on a shaft T. The cylinder of the pump R is provided with inlet and outlet passages 52 and 53, having check-valves 54 and 55, the valve 54 serving to permit the entrance of the oil and prevent its return flow and the valve 55 being arranged to permit the discharge of the oil from the cylinder R and to prevent its return flow to said cylinder. The outer end of the piston-rod is usually connected to a frame 56, having one or more pivoted arms 57 and a yoke 58, provided with a roller 59, said roller being adapted to be engaged by the cam-faces $r$ for effecting the movement of the piston against the action of the spring S. It is sometimes desirable to lessen the stroke of the piston of the pump R, and I therefore provide arms 57 with cam-faces 60, which are arranged eccentric to their pivotal connections 61 and are engaged with suitable fixed shoulders 62, provided on the cylinder, so that when the arms 57 are rocked in one direction the contact-roller 59 will be forced away from the shaft T, and the cam-teeth $r$ will therefore move the piston a less distance than when the rollers are permitted to approach the axis of said shaft. These arms 57 are usually secured to the opposite ends of the rocking spindle or pivotal pin 61, one of said arms being provided with a hand-engaging piece 63, by which the arms 57 may be simultaneously rocked in either direction for effecting the desired movement of the piston of the pump.

The inlet-opening 52 of the pump is connected to the supply-conduit I, and the outlet-passage 53 is connected to the reservoir J by a conduit 64, having its upper end adjacent to the reservoir J provided with a suitable spraying device 65. This spraying device usually consists of a cylinder having its upper end open and provided with a transversely-arranged screen 66 and its lower end provided with a conduit 67, discharging into the reservoir J, the upper end of the conduit 64 being extended through an aperture 68 in the shell 65 above the screen 66 and provided with a downturned end 69, discharging onto the upper surface of said screen. This shell 65 is provided with a central opening 70, extending downwardly from the open upper end of the shell and communicating with the conduit 67. It is therefore evident that the conduit 67 and shell 65 form a continuation of the conduit 64, and the screen 66 serves to atomize or spray the oil discharged from the downturned end 69 of the conduit 64, which enters the chamber J in this sprayed or atomized conditon, thereby greatly facilitating the vaporizing of the oil. It is also understood that by discharging the oil into this open-ended receptacle 65 a suitable amount of air is mixed with the atomized oil and is forced into the chamber J therewith.

The burner K is arranged directly beneath the reservoir J and generally consists of an ordinary oil-burner having an oil-reservoir 71 at its base, which, as previously stated, is supplied with oil from the oil-supply tank through the conduit I. In order to insure a permanent supply or definite quantity of oil in the reservoir of the burner K, I usually provide the conduit leading to the burner-reservoir with an automatic regulator, which is adapted to maintain a predetermined level of oil within the said reservoir of the burner. This automatic regulator generally consists of an oil-reservoir 72, arranged in substantially the same plane or in a plane slightly above the reservoir 71 of the burner and is provided with inlet and outlet openings 73 and 74 and a float 75, the inlet-opening being connected by a branch conduit 76 to the supply-conduit I, and the outlet-opening is connected by a conduit 77 to the reservoir 71 of the burner and preferably at its base. The inlet-opening 73 is provided with a valve 78, which is adapted to open inwardly by its own gravity and normally rests upon the stem or supporting-rod 79 of the float 75, said stem or rod 79 being hinged at 80 to the inner portion of the shell or casing of the reservoir 72.

In order to supply oil to the reservoir automatically, I usually arrange a main oil-supply tank in a plane above the receiver 72, so that the oil may readily flow by gravity to said receiver when the float 75 is sufficiently low to permit the valve 74 to be opened. After a sufficient quantity of oil has been admitted to this receiver the float is elevated and automatically closes the valve 74, thereby shutting off the supply of oil to the receiver 72. It is understood, however, that the oil is always supplied to the reservoir of the burner while said valve 74 is open and that both of said reservoirs are filled to the desired height or level before the float acts to close the valve 74. It is apparent that the relative position of the receiver 72 to the reservoir 71 of the burner automatically maintains a definite quantity of oil in the reservoir 71 and that when the oil is sufficiently low within the receiver 72 the float 75 permits the valve 74 to open for the admission of additional oil from the main supply-tank.

Any desired means may be employed for supporting the receiver in the desired position and permitting its vertical adjustment. This means usually consists of a clamp 81, having one end secured to the reservoir and its other end provided with a split annular band arranged to be clamped upon one of the vapor-supply conduits $j$ and provided with a clamping-screw 82 for forcing the split sections into engagement with the conduit $j$, said clamp permitting the receiver to be adjusted vertically along said conduit $j$ and secured at any desired height.

The means for igniting the live gases or vapor after the same has been drawn into the cylinder and compressed consists of an electric circuit having fixed sparking-terminals 83 arranged within the explosion-chamber in proximity to the upper end wall of said chamber and a circuit-closer 84 arranged externally to the cylinders for controlling the spark and synchronizing the ignition of the gases through said sparking-terminals with certain movements of the piston. The sparking-terminals 83 preferably consist of platinum wires secured to the inner ends of insulated conductors or wires 85, said wires being embedded in insulating material 86, which in turn is inclosed in a threaded tube or plug 87, secured in a threaded aperture 88 in the upper end wall of each of the cylinders B.

The circuit-closer 84 is preferably mounted upon the shaft T, previously mentioned in connection with the oil-pump R, and consists of a rocking frame or support 89, terminals 90 and 91, and eccentric cam-teeth 92 and 93, secured to the shaft T. The supporting-frame 89 is usually mounted upon the shaft T, is formed of insulating material, and consists of separated outer and intermediate bars or plates of fiber or similar material having their lower ends perforated for receiving the shaft T and their upper ends provided with a connecting-bar 94 for tying said plates to each other and holding them in their proper relative position. There are preferably two circuit-closers mounted upon the frame 89 and shaft T, one for each cylinder, the circuit-closer of each pair consisting of the terminals 90 and 91 and one of the series of the cam-teeth 92 or 93. The terminal 90 usually consists of a stud or metallic projection having the adjusting-screw 95, and the terminal 91 generally consists of a similar stud having a spring-arm 96 and a contact-surface 97 at its intermediate portion, the free end of said spring being provided with an engaging shoulder 98, adapted to be engaged by one of the series of cam-teeth, as 92, whereby the contact-face 97 is forced into contact with the inner end of the adjusting-screw 95, said spring being so arranged as to be normally separated from said terminal 91, except at certain intervals of movement of the piston C. The shaft D is supported upon an upright standard U, projecting upwardly from the upper ends of the cylinders B, is provided with a gear 99, meshing with a pinion 100, which is secured to the main shaft E in order to obtain the proper movement of the shaft T, bearing the oil-pump-operating cams $r$ and the cam-teeth 92 and 93 with relation to the movement of the piston C. The gear 99 is formed of substantially twice the diameter of the pinion 100, thereby rotating the shaft T at substantially half the rate of speed as the shaft E, which shaft T is also rotated in a reverse direction of movement of the shaft E. I also provide the shaft T with cams $t$, which are adapted to operate suitable bell-cranks $t'$, which in turn are arranged to open the exhaust-valves 24 upon each alternate upward movement of the pistons C. These bell-cranks $t'$ are pivoted at $u$ to the upright standard U, their upper ends being provided with anti-friction-rollers $u'$ for engaging the cams $t$, and the opposite ends of said bell-cranks are adapted to normally rest upon the upper ends of the exhaust-valve stems 26.

Figure 1:
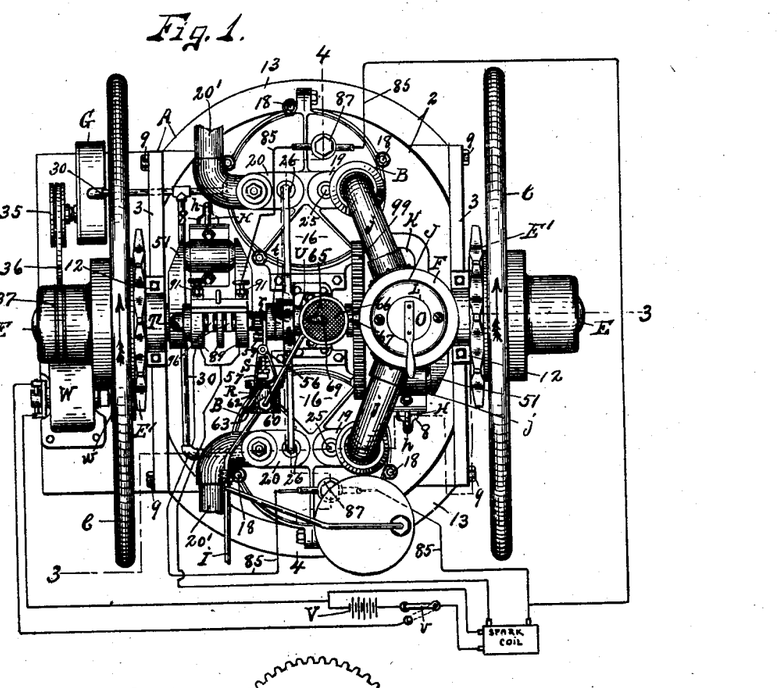
Figure 1 is a top plan of my improved oil-vapor engine.
Figure 2:
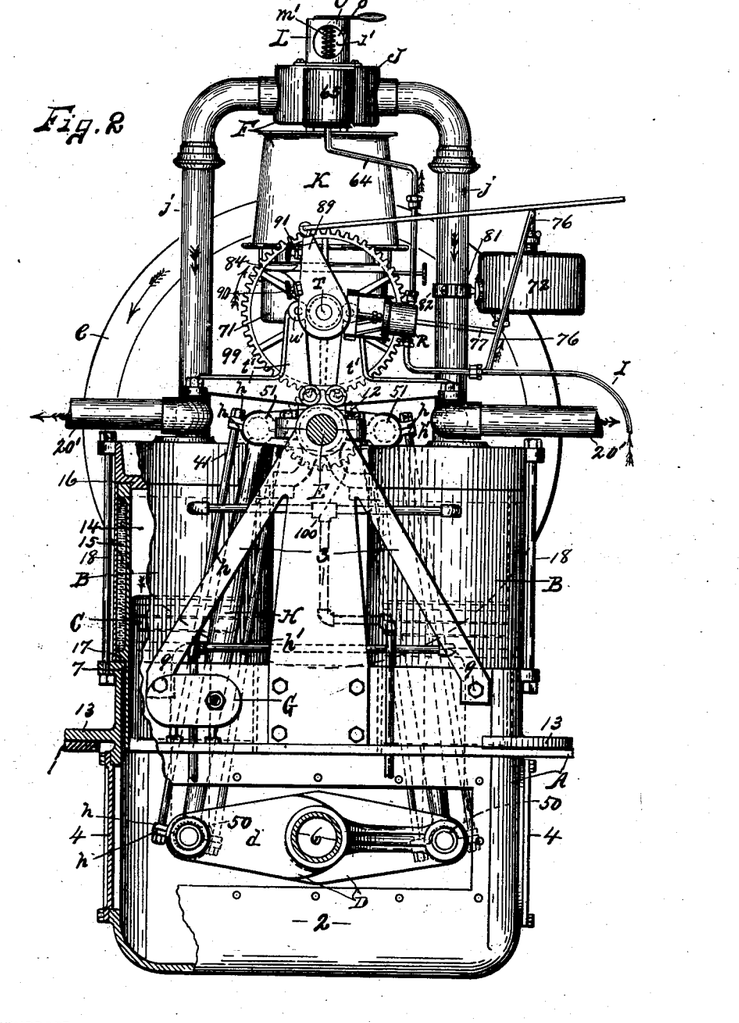
Fig. 2 is a side elevation, partly broken away, of my improved engine, one of the balance-wheels being removed and the pistons and parts operated thereby being shown in their intermediate position.
Figure 4:
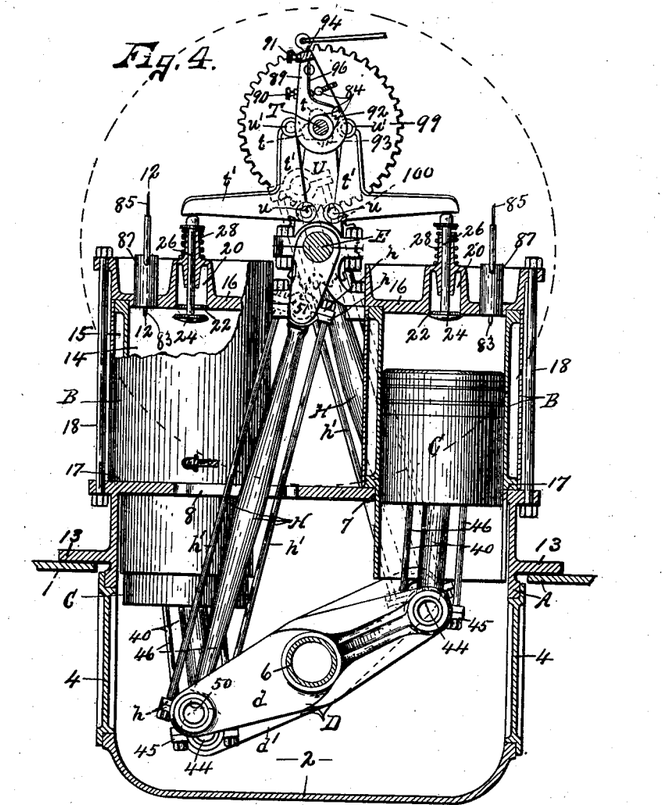
Figure 5:
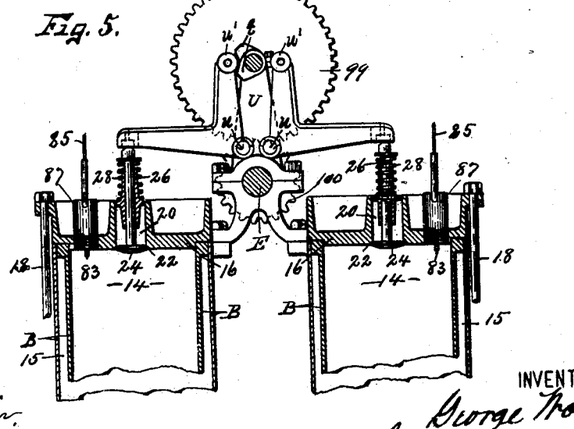
Fig. 5 is a sectional view similar to Fig. 4 of the upper portion of the cylinders, showing particularly the exhaust-valves and the means for operating the same.
Figure 6:
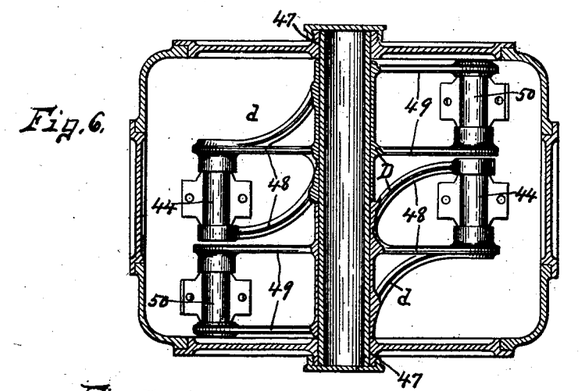
Fig. 6 is a horizontal section taken on line 6 6, Fig. 3.
Figure 7:
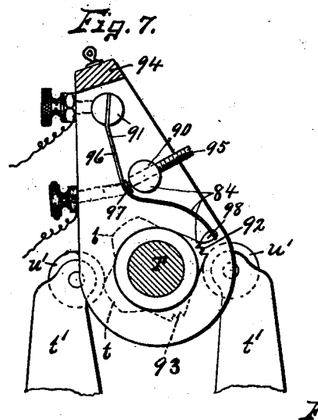
Figs. 7 and 8 are sectional views taken, respectively, on lines 7 7 and 8 8, Fig. 3, showing, respectively, the circuit-closer and the means for operating the oil-pump.
Figure 8:
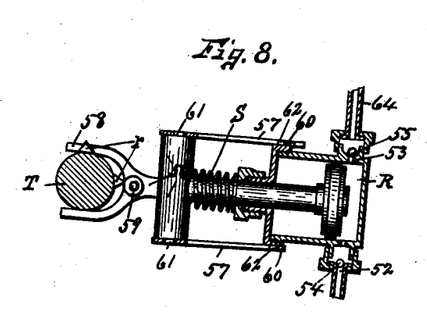
Figure 9:
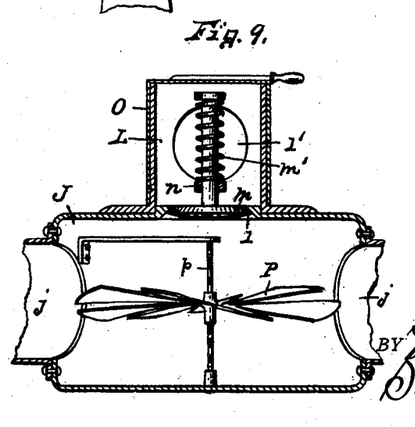
Figs. 9 and 10 are sectional views taken, respectively, on lines 9 9 and 10 10, Fig. 3.
Figure 10:
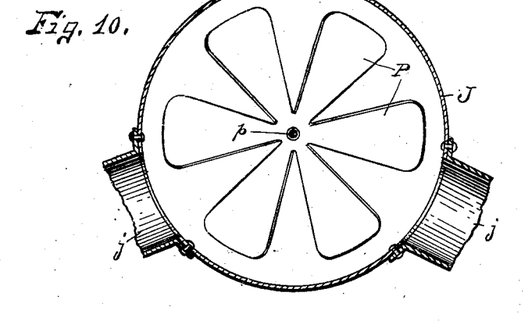
Figure 11:
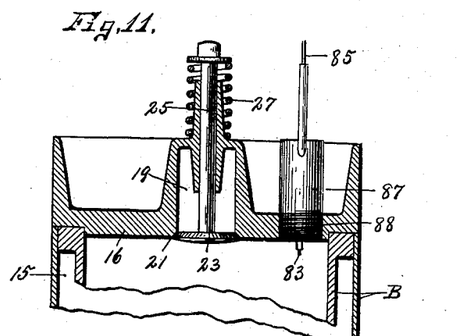
Fig. 11 is a sectional view taken on lines 11 11, Fig. 3.
Figure 12:
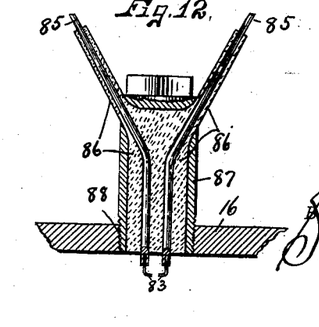
Fig. 12 is an enlarged sectional view taken on lines 12 12, Fig. 4.

As seen in Fig. 4, the piston at the right-hand cylinder is shown as moved to its upward limit of stroke and as compressing the live gases within the explosion-chamber, and the piston C at the left of said chamber is shown as in its extreme lower position. When the piston is in its upward position, as seen at the right in Fig. 1, the teeth 92 of the circuit-closer for that cylinder are in the position for engaging the shoulder 98 and forcing the contact-face 97 of the terminal 91 into engagement with the terminal 90, thereby closing the circuit through the sparking-terminals of this cylinder and igniting the live gases therein. The gases thus ignited force the piston downwardly, thereby actuating the walking-beam section connected thereto and also the main shaft E through the connecting-rod, which is connected to the opposite end of said walking-beam section. This movement of the piston rotates the shaft E one complete revolution. When the piston has been forced to the limit of its downward movement, the exhaust-valve of the chamber of said piston is opened by means of the corresponding bell-crank and cam $t$ for operating the same, so that when the pistons return upwardly the exploded gases are forced outwardly through the exhaust-chamber, as seen at the left, Fig. 4. When one of the pistons is being forced down by the explosion, the exhaust-valve of the other piston is opened for discharging the exploded gases therefrom, and the cam $t$ upon the shaft T are so relatively arranged as to effect this movement of the exhaust-valves through the bell-cranks $t'$, and the cam-teeth 92 and 93 are also so relatively arranged as to ignite the gases at each alternate upward stroke of the said pistons after the exploded gases have been expelled from the explosion-chambers.

In order to provide for the initial ignition of the gases within the explosion-chambers, I provide a battery V, which is connected by a switch $v$ to the circuit of the sparking-terminals and circuit-closers. I also provide a dynamo W, which is also connected to the circuit provided with the sparking-coils and circuit-closers and is actuated by one of the balance-wheels E, preferably through the means of a friction-wheel $w$, provided on the shaft of the dynamo and engaged with the periphery of the balance-wheel E. The switch $v$ is connected also to the dynamo-circuit in order that after the engine is started the switch may be connected with the dynamo-circuit and the engine adapted to supply its own current through the dynamo W.

The operation of my invention will now be readily understood upon reference to the foregoing description and the accompanying drawings, and it will be noted that some change may be made in the detail construction and arrangement of the parts of my invention without departing from the spirit thereof. Therefore I do not limit myself to the precise construction and arrangement shown and described.

Having thus fully described my invention, what I claim, and desire to secure by Letters Patent, is—

1. In a vapor-engine, a pair of independent cylinders each provided with an explosion-chamber and a piston, a rotary crank-shaft at the closed ends of the cylinders, means for supplying explosive gases to the chambers, electric means controlled by the engine for igniting said gases, a walking-beam journaled at the open ends of the chambers and composed of independently-movable sections each having an arm connected to one of the pistons and an additional oppositely-projecting arm connected to the crank-shaft.

2. A vapor-engine comprising a cylinder having an explosion-chamber and a piston, a walking-beam at the open end of the chamber and connected to the piston, a crank-shaft at the closed end of the chamber and connected to the walking-beam, inlet and exhaust valves in the closed end of the chamber, means for introducing vapor in the explosion-chamber, a second shaft at the closed end of the chamber rotated by the crank-shaft, sparking-terminals of an electric circuit in the explosion-chamber, a circuit-closer connected in the electric circuit and means provided on the second shaft for controlling the operation of the circuit-closer.

3. In a vapor-engine, in combination, a cylinder having an explosion-chamber and a piston, a walking-beam at the open end of the chamber and connected to the piston, a crank-shaft at the closed end of the chamber and connected to the walking-beam, means for introducing vapor into the explosion-chamber, inlet and exhaust valves in the closed end of the explosion-chamber, a second shaft rotated by the crank-shaft, sparking-terminals in the electric circuit in the explosion-chamber, means provided on the second shaft for closing the circuit through the sparking-terminals and additional means actuated by the second shaft for opening the exhaust-valves.

4. A vapor-engine comprising a cylinder having an explosion-chamber and inlet and exhaust valves, a piston movable in the chamber, a walking-beam at the open end of the chamber and connected to the piston, a crank-shaft at the closed end of the chamber and connected to the walking-beam, a second shaft at the closed end of the chamber rotated by the crank-shaft, an oil-vaporizing device connected to the explosion-chamber, a pump connected to an oil-supply conduit and to the vaporizing device for the purpose described and means provided on the second shaft for actuating the pump.

5. A vapor-engine comprising a cylinder having an explosion-chamber and inlet and exhaust ports, sparking-terminals of an electric circuit within the explosion-chamber, a piston movable in the chamber, a walking-beam at the open end of the chamber, and connecting to the piston, a crank-shaft at the closed end of the chamber and connected to the walking-beam, a vaporizing device connected to the inlet-port, a valve for the exhaust-port, a second shaft rotated by the crank-shaft, a lever for opening the exhaust-valve, means provided on the second shaft for operating the lever, a pump for supplying oil to the vaporizing device, and means provided on the second shaft for operating the pump.

6. In a vapor-engine, in combination, a cylinder having an explosion-chamber and inlet and exhaust ports, valves for the ports, sparking-terminals of an electric circuit in the explosion-chamber, a crank-shaft at the closed end of the chamber, connections between the piston and the crank-shaft for rotating the crank-shaft, a second shaft actuated by the crank-shaft, a circuit-closer connected in the electric circuit, means provided on the second shaft for operating the circuit-closer, a lever for opening the exhaust-valve, additional means provided on the second shaft for operating the lever and an oil-vaporizing device connected to the inlet-opening for the purpose set forth.

7. A vapor-engine comprising a cylinder having an explosion-chamber and inlet and exhaust ports, valves for the ports, a piston movable in the chamber, a crank-shaft at the closed end of the chamber, connections between the piston and the crank-shaft for rotating the latter, a second shaft rotated by the crank-shaft, an oil-vaporizing device connected to the inlet-opening, a pump for supplying oil to the vaporizing device, means provided on the second shaft for operating the pump, sparking-terminals of an electric circuit in the explosion-chamber, a circuit-closer connected in said circuit means provided on the second shaft for operating the circuit-closer, a lever for opening the exhaust-valve and additional means provided on the second shaft for operating the lever.

In witness whereof I have hereunto set my hand this 31st day of January, 1901.

GEORGE WOOD.

Witnesses:
CHESTER R. HOAG,
WM. A. JONES.